United States Patent
Guy

(10) Patent No.: US 11,433,723 B1
(45) Date of Patent: Sep. 6, 2022

(54) FIFTH-WHEEL RECEIVER COVER

(71) Applicant: Jammie Guy, Palm Beach Gardens, FL (US)

(72) Inventor: Jammie Guy, Palm Beach Gardens, FL (US)

(*) Notice: Subject to any disclaimer, the term of this patent is extended or adjusted under 35 U.S.C. 154(b) by 206 days.

(21) Appl. No.: 16/990,105

(22) Filed: Aug. 11, 2020

(51) Int. Cl.
*B60D 1/60* (2006.01)
*B62D 53/08* (2006.01)

(52) U.S. Cl.
CPC ........... *B60D 1/60* (2013.01); *B62D 53/0885* (2013.01); *B60D 1/605* (2013.01)

(58) Field of Classification Search
CPC ....... B60D 1/60; B60D 1/605; B62D 53/0885
See application file for complete search history.

(56) References Cited

U.S. PATENT DOCUMENTS

| | | | |
|---|---|---|---|
| 5,058,914 A * | 10/1991 | Murcheson | B62D 53/0885 280/433 |
| 5,536,031 A | 7/1996 | Hurley | |
| 6,443,476 B1 * | 9/2002 | Molock, Jr. | B62D 53/0885 280/433 |
| D534,844 S * | 1/2007 | Eskandry | D12/177 |
| 7,703,791 B2 | 4/2010 | Varjassy | |
| D668,588 S * | 10/2012 | Eastman | D12/161 |
| 2008/0106066 A1* | 5/2008 | Varjassy | B60D 1/60 280/507 |
| 2013/0175787 A1* | 7/2013 | L'Heureux | B60D 1/60 280/507 |

* cited by examiner

*Primary Examiner* — Minnah L Seoh
*Assistant Examiner* — Marlon A Arce
(74) *Attorney, Agent, or Firm* — Sanchelima & Associates, P.A.; Christian Sanchelima; Jesus Sanchelima

(57) ABSTRACT

A fifth wheel cover is disclosed herein. The fifth-wheel hitch cover includes a magnetically attachable support with an integrated reel apparatus. Additionally, the reel supports a cover that is retractable, and the cover has a magnetic anchor bar on the end opposite the reel. The fifth wheel cover may come in the form of a storage box containing the cover therein. The storage box is then mounted onto a frame of a truck. A user may then retract the cover to provide protection to the fifth wheel from weather and debris. Additionally, a heated underplate may be included beneath the fifth wheel to provide protection from debris that may come in contact with the fifth wheel. Another embodiment includes a fifth wheel cover having a frame including foldable arms which extend a cover over the fifth wheel.

11 Claims, 5 Drawing Sheets

FIFTH-WHEEL RECEIVER COVER

BACKGROUND OF THE INVENTION

1. Field of the Invention

The present invention relates to a fifth-wheel cover and, more particularly, to a fifth wheel cover that includes a storage box housing a retractable cover used to protect a fifth wheel from debris and harsh weather.

2. Description of the Related Art

Several designs for a fifth wheel cover have been designed in the past. None of them, however, include a fifth-wheel hitch cover comprising a magnetically attachable support with an integrated reel apparatus. Additionally, the reel supports a cover that is retractable, and the cover has a magnetic anchor bar on the end opposite the reel. The fifth wheel cover may come in the form of a storage box containing the cover therein. The storage box is then mounted onto a frame of a truck. A user may then retract the cover to provide protection to the fifth wheel from weather and debris. Additionally, a heated underplate may be included beneath the fifth wheel to provide protection from debris that may come in contact with the fifth wheel. Another embodiment includes a fifth wheel cover having a frame including foldable arms which extend a cover over the fifth wheel. It is known that truckers must often maintain a clean and proper fifth wheel so it may be used to continuously mount trailers for transport. It is also known that improper care and treatment and care of a fifth wheel could lead to potential accidents. A trailer could potentially dislodge from a fifth wheel if the fifth wheel is not properly maintained. This could potentially cause major accidents on roadways. These accidents could be prevented by maintaining a clean and protected fifth wheel. Therefore, there is a need for a fifth wheel cover to protect a fifth wheel from damaging weather conditions and debris.

Applicant believes that a related reference corresponds to U.S. Pat. No. 5,536,031 issued for a cover apparatus for a fifth wheel cover. The cover apparatus includes principal and tail portions and a kingpin shaft and licking washer for licking the hitch plate cover in place after the trailer has been removed from the fifth wheel hitch. Applicant believes that another related reference corresponds to U.S. Pat. No. 7,703,791 issued for a slip-on elastic cover for a fifth wheel plate. The cited disclosure includes a shell arranged to span over the fifth wheel plate of a tractor trailer chassis. However, the cited references differ from the present invention because they fail to disclose the magnetically attachable support with an integrated reel apparatus. The reel apparatus includes a cover that is retractable and then entirely covers a fifth wheel of a truck. Additionally, the cited reference fail to disclose an underplate placed beneath the fifth wheel in order to provide protection from debris while driving.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a fifth wheel cover that provides protection from harsh weather conditions and debris to a fifth wheel of a truck.

It is another object of this invention to provide a fifth wheel cover provided in a storage box configuration that is easily mounted onto a truck frame containing a fifth wheel.

It is still another object of the present invention to provide a fifth wheel cover that may include a heated underplate that prevents the grease of a fifth wheel from freezing.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
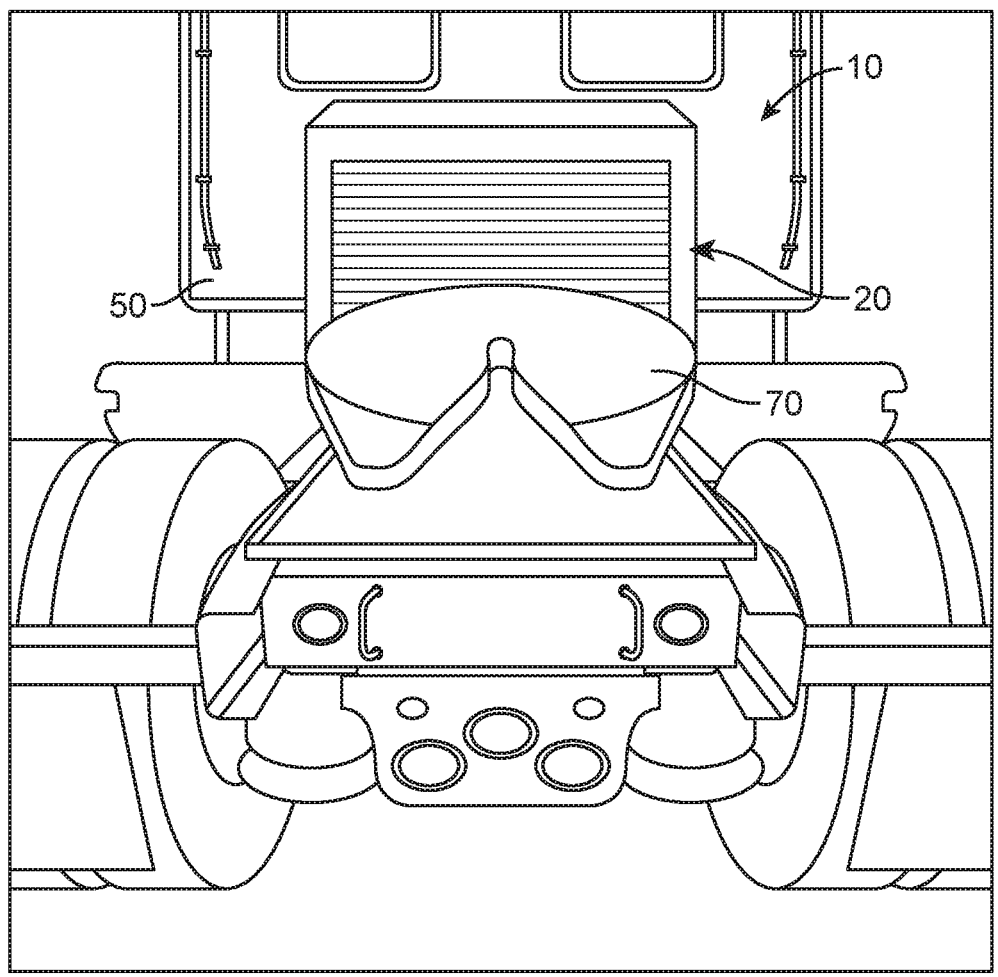
FIG. 1 represents an operational isometric view of fifth wheel cover 10 in accordance to an embodiment of the present invention.
Figure 2:
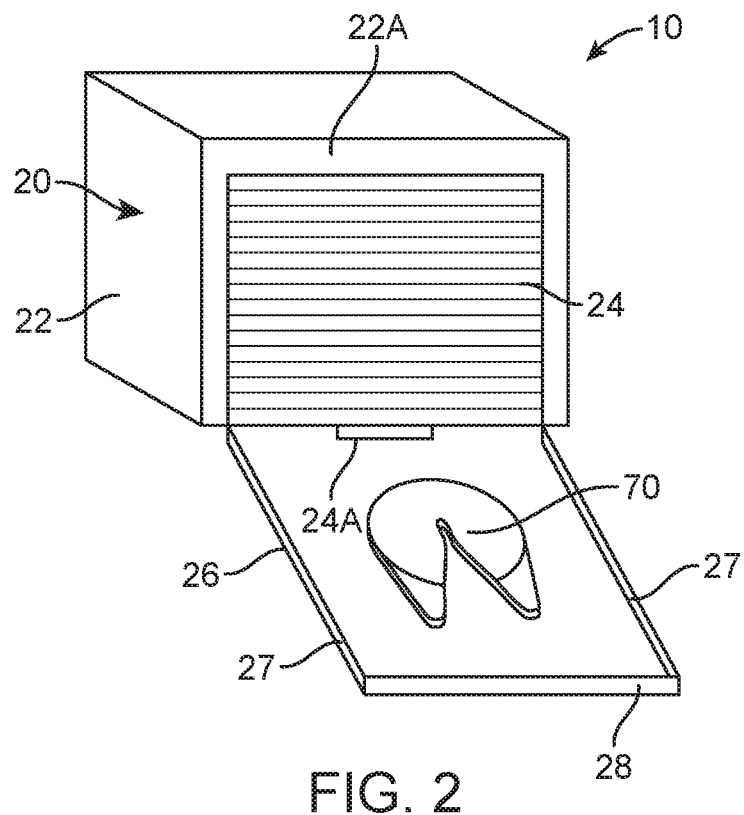
FIG. 2 shows an isometric view of housing assembly 20 in of fifth wheel cover 10 in accordance to an embodiment of the present invention.
Figure 3:
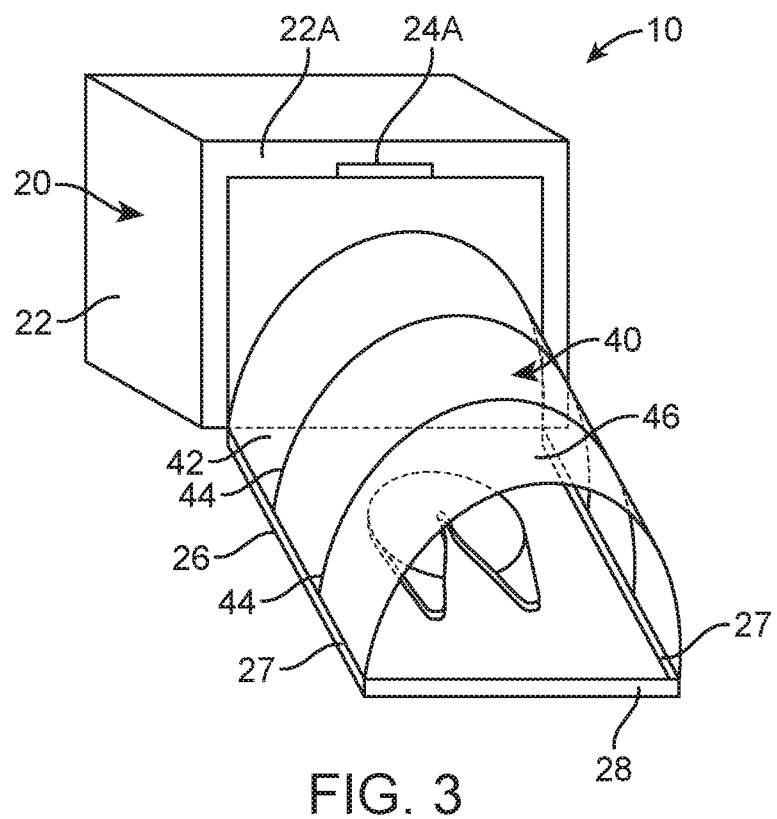
FIG. 3 illustrates an isometric view of housing assembly 20 having cover assembly 40 retracted from therein in accordance to an embodiment of the present invention.
Figure 4:
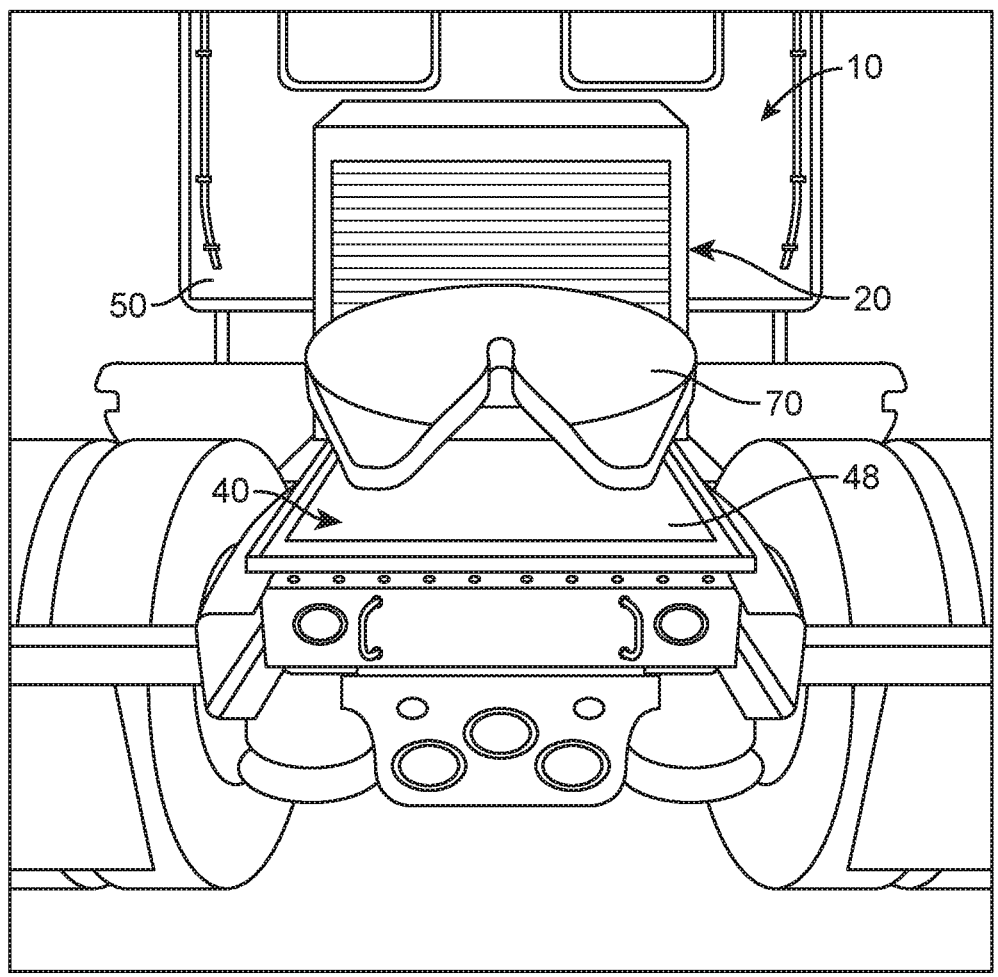
FIG. 4 is a representation of an isometric rear view of truck 00 depicting underplate 00 in accordance to an embodiment of the present invention.

Referring now to the drawings, where the present invention is generally referred to with numeral 10, it can be observed a fifth wheel cover 10 that includes a housing assembly 20 and a cover assembly 40.

Housing assembly 20 includes a container 22 having a front end 22A. In one embodiment, container 22 may be provided in a cubic rectangular configuration and made of a metallic material. The configuration of the material aids container 22 in protecting the cover assembly 40 that is housed therein. Other embodiments of the present invention may feature a container 22 having other various distinct shapes and materials. Additionally, front end 22A includes a door 24 mounted thereon. Door 24 provides a user access to an interior space within container 22. In one embodiment, door 24 may be provided as a vertical slidable door that opens when an upward force is applied to the door. Furthermore, door 24 may also include a handle located at a bottom end. A user may then grasp the handle in order to then provide an upward force to door 24 in order to recess the door within the container 22 and reveal the interior space therein. The opening of door 24 may be performed manually by a user. Additionally, the openings of door 24 may also be actuated through a button accessed by a truck driver. In another embodiment, door 24 may be actuated to open upon actuating a pressure plate. Other embodiments of the present invention may feature a variety of other door configurations such as but not limited to a hinged door, a removable door, and the like.

In the present embodiment, container 22 is configured to be mounted onto truck 50 as seen in FIG. 1. Container 22 may be mounted onto the truck using known mechanisms in the art such as fasteners, adhesives, welding, and the like. In a preferred embodiment, container 22 is mounted behind a fifth wheel 70 that is located on a rear end of truck 50. Other embodiments may feature container 22 mounted in different configurations along the frame of truck 22. Housing assembly 20 further includes an integrated reel apparatus such as railing system 26 that is mounted onto the front end 22A. In one embodiment, railing system 26 includes slidable tracks 27 extending from front end 22A. Additionally, slidable tracks 27 may be configured to be positioned in a parallel configuration. Slidable tracks 27 may be provided as any form of suitable railing known the art used to easily slide objects. In the present embodiment, slidable tracks 27 allow for cover assembly 40 to be easily retracted from container 22 through a sliding means. Additionally, slidable tracks 27 are mounted along the frame of truck 50 surrounding side ends of fifth wheel 70. In one embodiment, slidable tracks 27 extend along side ends of fifth wheel 70. Additionally, slidable tracks 27 may extend a length longer that a length of fifth wheel 70. This provides the most optimal configuration for cover assembly 40 to be retracted and entirely cover fifth wheel 70. Railing system 26 further includes an anchor bar 28 located at a distal end of slidable tracks 27. In one embodiment, anchor bar 28 may be provided as a magnetic metal bar that is attached to slidable tracks 27. Anchor bar 28 is configured to receive a magnetic structure of cover assembly 40 in order to create a secure attachment when said cover assembly 40 is retracted. Other embodiments may feature an anchor bar with other various attaching means known in the art. This may include such means as fasteners, lock systems, and the like.

Cover assembly 40 includes a cover 42 that is slidably housed within container 22. In one embodiment, cover 42 includes support arcs 44 which are slidably coupled within slidable tracks 47. Support arcs 44 may contain a semicircular shape and be made of a metallic material. The slidable configuration of cover 42 allows a user to easily retract cover 42 from housing assembly 20 in order to properly protect fifth wheel 70. This slidable configuration may be achieved by mounting wheels to a bottom end of each support arc 44 when coupled to slidable tracks 27. Other embodiments may feature support arcs 44 having different shapes and configurations. In one such embodiment, support arcs 44 may have a rectangular shape. A sheet 46 is then provided to be placed over support arcs 44 to then entirely cover fifth wheel 70. In one embodiment, sheet 46 is adhesively mounted onto support arcs 44. Additionally, sheet 46 is preferably made of a weather resistant material to withstand harsh cold and hot weather conditions. The purpose of cover assembly 40 is to protect fifth wheel 70 from these harsh weather conditions and debris. An Unprotected fifth wheel could face a variety of issues when not properly protected. A mounted trailer could very well dislodge from truck 50 if a proper fifth wheel 70 is not maintained. Fifth wheel cover 10 accomplishes with great success to protect the fifth wheel for continuous use.

Cover assembly 40 may also include an underplate 48 that is mounted beneath fifth wheel 70. In one embodiment, underplate 48 is a rectangular metal plate that is removable in nature. Additionally, underplate 48 is positioned to cover an entire bottom end of fifth wheel 70. Furthermore, underplate 48 may be mounted to truck 50 using known mechanisms in the art such as welding, fasteners, adhesives, and the like. In the present embodiment, underplate 48 provides protection to fifth wheel 70 from debris that may come in contact with the device from the bottom end. In one embodiment, underplate 48 may be a heated metal plate. The temperature of this plate may be controlled by a truck driver operating truck 50. The heated nature of underplate 48 will prevent the grease located on fifth plate 70 from freezing.

Figure 5:
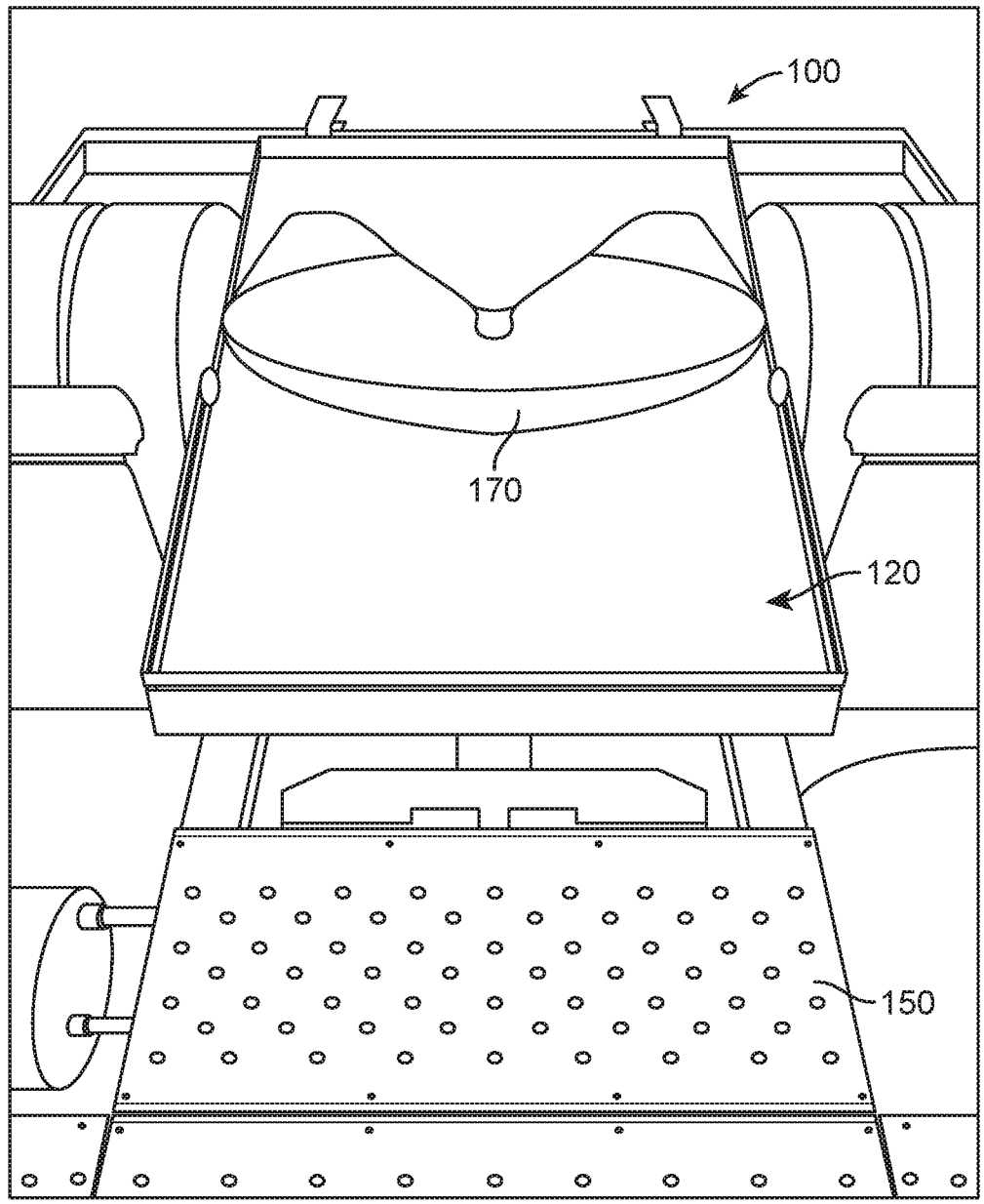
FIG. 5 shows an isometric operational view of fifth wheel cover 100 in accordance to an embodiment of the present invention.
Figure 6:
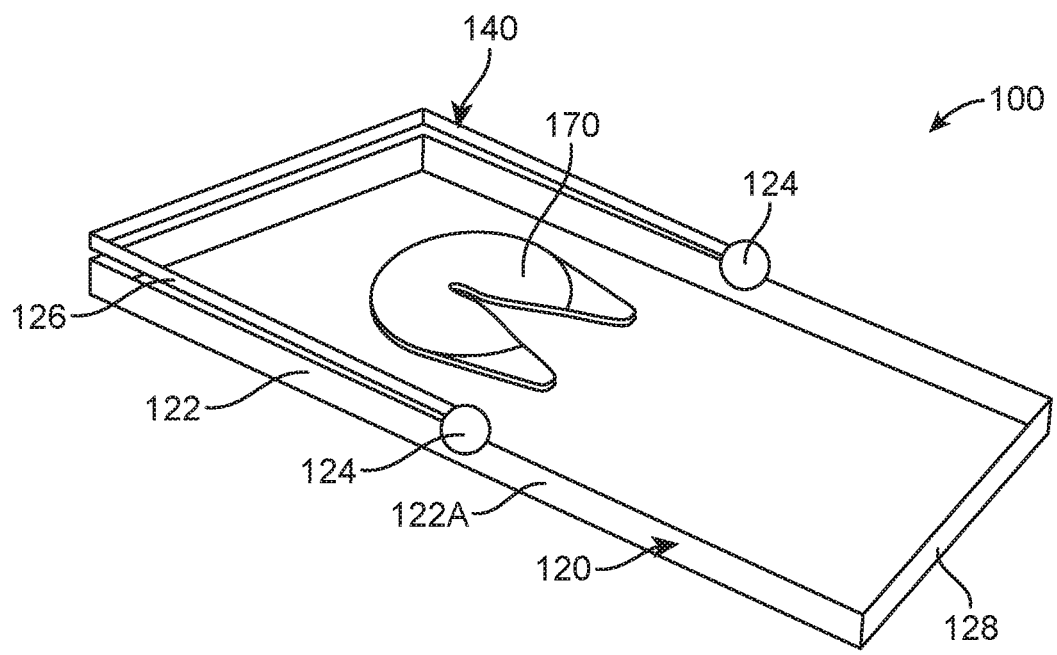
FIG. 6 illustrates an isometric view of frame assembly 120 of fifth wheel cover 100 in accordance to an embodiment of the present invention.
Figure 7:
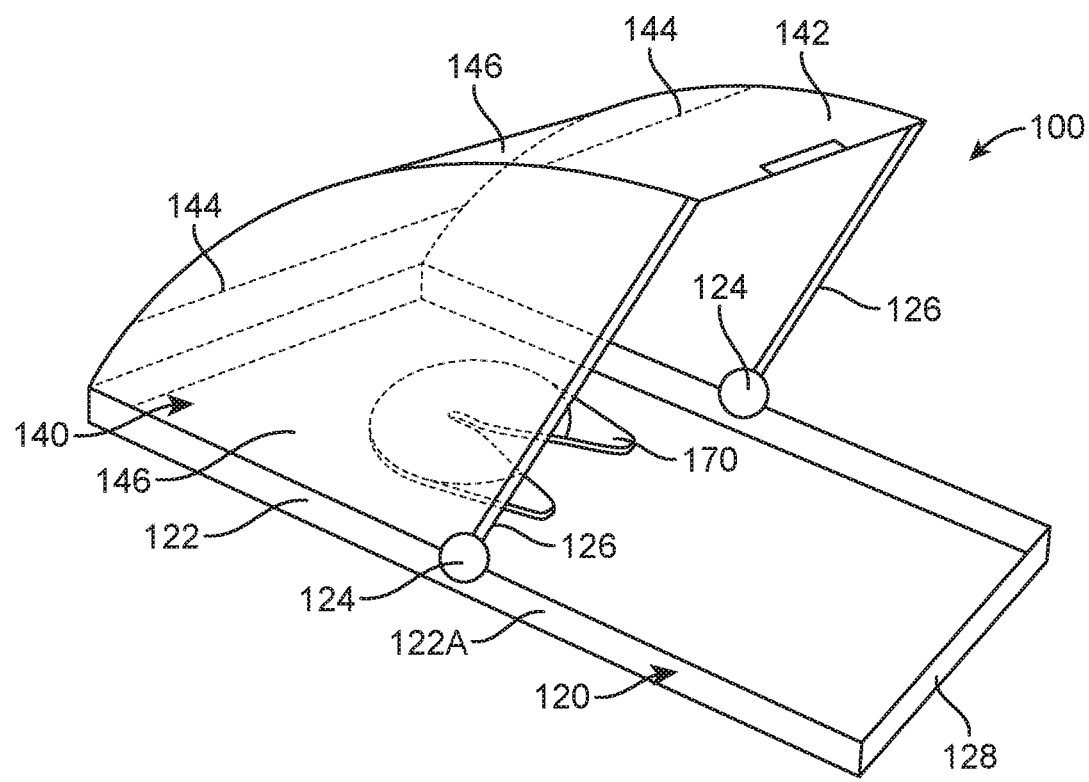
FIG. 7 represents an isometric view of cover assembly 140 retracted from frame assembly 120 in accordance to an embodiment of the present invention.

Now referring to FIGS. 5, 6, and 7, it can be observed another embodiment of fifth wheel cover 100 that includes a frame assembly 120 and a cover assembly 140.

Frame assembly 120 includes a frame 122 that is mounted onto truck 150 and surrounding a perimeter of fifth wheel 170. In one embodiment, frame 122 is a rectangular frame having sidewalls 122A. Additionally, frame 122 may be made of a strong metallic material. Frame 122 may be mounted onto truck 150 using known fastening means in the art such as fasteners, welding, adhesives, and the like. Frame 122 may further include pivot points 124 disposed along a center portion of frame 122. In one embodiment, pivot points 124 are located on opposite ends of each other on frame 122. A pivoting arm 126 is then mounted to each of pivot points 124. In one embodiment, pivoting arm 126 is a metallic arm having cover assembly 126 mounted thereon. Additionally, pivoting arm 126 is configured to rotate a full 180 degrees to cover the entire top end of fifth wheel 170. In the present embodiment, one of sidewalls 122A includes an anchor bar 128. Anchor bar 128 may be a magnetic metal bar forming a sidewall of frame 122. In the present embodiment, anchor bar 128 is located in a perpendicular configuration from a sidewall containing pivoting points 124. Anchor bar 128 receives cover assembly 140 to create a secure attachment. Frame assembly 120 provides another efficient method for using cover assembly 140 to entirely cover and protect fifth wheel 170.

Cover assembly 140 includes a cover 142 mounted to pivoting arm 126 and frame 122. In the present embodiment, cover 142 is configured to entirely cover fifth wheel 170. Additionally, cover 142 includes support members 144 horizontally mounted along cover 142. Support members 144 may have a curvature and be made of a metallic material. Other embodiments may feature support members 144 of varying shape and materials. A sheet 146 is then placed over support members 144 to create a secure protection layer for fifth plate 170. In one embodiment, sheet 146 is made of a weather resistant material to provide protection against harsh cold and hot weather conditions. Cover 142 may be coupled to anchor bar 128 to create a dome like shape encompassing fifth wheel 170.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a fifth wheel cover, comprising:
   a) a truck;
   b) a fifth wheel mounted onto a rear end of said truck;
   c) a housing assembly including a storage container having a front end, said front end including a door to provide access to an interior space of said storage container, an integrated reel apparatus extending from said front end, said reel apparatus including two tracks in a parallel configuration, wherein said storage container is mounted behind said fifth wheel; and d) a cover assembly including a cover retractably housed within said storage container, said cover including support members mounted onto said two tracks of said reel apparatus, wherein said support members slide along said two tracks, wherein said cover includes a sheet mounted over said support members.

2. The system for a fifth wheel cover of claim 1 wherein said door is a vertical slidable door that includes a handle.

3. The system for a fifth wheel cover of claim 1 wherein said storage container has a cubic-rectangular shape.

4. The system for a fifth wheel cover of claim 1 wherein said two tracks extend along sidewalls of said fifth wheel.

5. The system for a fifth wheel cover of claim 1 wherein said cover entirely covers said fifth wheel.

6. The system for a fifth wheel cover of claim 1 wherein said reel apparatus includes a magnetic anchor bar to magnetically receive said cover.

7. The system for a fifth wheel cover of claim 1 wherein said sheet is made of a weather resistant cloth material.

8. The system for a fifth wheel cover of claim 1 wherein said cover assembly includes an underplate mounted beneath said fifth wheel configured to protect said fifth wheel from road debris.

9. The system for a fifth wheel cover of claim 8 wherein said underplate is a heated metal sheet.

10. A system for a fifth wheel cover, comprising:
a) a truck;
b) a fifth wheel mounted onto a rear end of said truck;
c) a housing assembly including a storage container having a cubic rectangular shape, wherein said storage container includes a front end having a door, wherein said door is a vertical slidable door that slides upwardly to provide access to an interior space within said storage container, said door including a handle at a bottom end, a railing system mounted to said front end of said storage container, said railing system including a set of two slidable tracks in a parallel configuration to each other, wherein said storage container is mounted behind said fifth wheel, wherein said two slidable tracks extend along side ends of said fifth wheel, wherein said two slidable tracks extend a length longer than a length of said fifth wheel, a magnetic anchor bar coupled to a distal end of said two tracks; and d) a cover assembly including a slidable cover housed within said storage container, wherein said slidable cover includes a plurality of support arcs slidably mounted over said two slidable tracks, wherein said plurality of support arcs have a semi-circular shape and made of a metal material, a sheet mounted over said plurality of support arcs, wherein said sheet entirely covers said fifth wheel, wherein said sheet is made of a weather resistant material, said sheet being adhesively coupled over said plurality of support frames, an underplate placed beneath said fifth wheel, wherein said underplate is a rectangular metal sheet that covers an entire bottom end of said fifth wheel, said underplate configured to protect said fifth wheel from road debris.

11. A system for a fifth wheel cover, comprising
a) a truck;
b) a fifth wheel mounted onto a rear end of said truck;
c) a frame assembly including a rectangular frame having sidewalls, wherein said fifth wheel is located within said rectangular frame, two pivot points located on opposite ends of a middle portion of said rectangular frame, a pivoting arm mounted to each of said two pivot points, wherein one of said sidewalls is a magnetic anchor bar; and
d) a cover assembly including a cover mounted to said pivoting arm and said rectangular frame, wherein said cover includes support members, a sheet mounted over said support members configured to entirely cover said fifth wheel, wherein said pivoting arm rotates a full one-hundred and eighty degrees to reach each end of said rectangular frame, wherein said cover is then coupled to said magnetic anchor bar.

\* \* \* \* \*